United States Patent [19]

Faroudja

[11] 4,179,705
[45] Dec. 18, 1979

[54] METHOD AND APPARATUS FOR SEPARATION OF CHROMINANCE AND LUMINANCE WITH ADAPTIVE COMB FILTERING IN A QUADRATURE MODULATED COLOR TELEVISION SYSTEM

[76] Inventor: Yves C. Faroudja, 26595 Anacapa Dr., Los Altos Hills, Calif. 94022

[21] Appl. No.: 886,164

[22] Filed: Mar. 13, 1978

[51] Int. Cl.² .......................................... H04N 9/535
[52] U.S. Cl. ...................................................... 358/31
[58] Field of Search ...................... 358/31, 8; 328/166

[56] References Cited

U.S. PATENT DOCUMENTS

| 4,050,084 | 9/1977 | Rossi | 358/31 |
| 4,072,984 | 2/1978 | Kaiser | 358/31 |

Primary Examiner—Robert L. Griffin
Assistant Examiner—Aristotelis M. Psitos
Attorney, Agent, or Firm—David B. Harrison

[57] ABSTRACT

Chrominance and luminance components of a quadrature modulated color television signal are separated by a comb filtering system which includes a chroma separation circuit connected to an input and an adaptive luminance separation circuit also connected directly to the input. The chroma separation circuit includes a one line delay line and a high pass filter connected in parallel therewith. The delay line and the high pass filter are connected to a first subtractor which combines the inputs to provide a comb filtered chroma output. The adaptive luminance separation circuit includes a threshold circuit connected to an output of the chroma separation circuit. The threshold circuit puts out only those portions of separated chroma which exceed a predetermined threshold amplitude. A limiting amplifier connected to the threshold circuit puts out amplitude limited signals of the same phase and polarity as the portions put out by the threshold circuit only when they exceed the predetermined threshold level. An adder circuit is connected to combine the outputs of the threshold circuit of the limiting amplifier. A second subtractor is connected to the output of the adder circuit and is connected to the system input through a delay matching network having a delay equal to the delay of the signal at the output of the adder circuit. The second subtractor subtracts the output of the adder circuit from the output of the delay matching circuit, the difference therefrom being adaptively separated and filtered luminance. Optional circuit elements provide further improvements in chrominance filtering and adaptive luminance filtering.

10 Claims, 6 Drawing Figures

METHOD AND APPARATUS FOR SEPARATION OF CHROMINANCE AND LUMINANCE WITH ADAPTIVE COMB FILTERING IN A QUADRATURE MODULATED COLOR TELEVISION SYSTEM

BACKGROUND OF THE INVENTION

1. Field of the Invention

The present invention relates to a method and apparatus for separation of signal components, one of which is modulating a main carrier and another of which is a quadrature modulated subcarrier which is interleaved between some adjacent sidebands of the main carrier on a portion of the spectrum thereof. More particularly, the method and apparatus of the present invention effectively applies adaptive comb filtering techniques to a quadrature modulated subcarrier color television signal in order to separate chrominance and luminance signal components without significant signal degradation due to resolution losses or chrominance to luminance crosstalk, effects which are generated by the previously known separation techniques.

2. Description of the Prior Art

In consideration of designs for color television systems and signal formats, it has been recognized that the human eye does not require as much chrominance (color hue and saturation) detail information as is required for luminance (brightness) information for the same apparent picture resolution. Since the eye is extremely sensitive to brightness changes insofar as resolution is concerned, most television systems signal formats, such as the National Television System Committee (NTSC) format, devote approximately 4 megahertz of bandwidth to luminance information (the NTSC standard being 4.2 megahertz). For hue or saturation changes which are not accompanied by corresponding changes in luminance, the eye is satisfied with one-third to one-tenth of the resolution needed for brightness. Thus, encoded color subcarrier signals are accorded much less bandwidth than that devoted to luminance information. In the NTSC system the I color subcarrier component has a 1.3 MHz bandwidth while the Q color subcarrier component bandwidth is only 500 KHz. The consequence of bandwidth limitations on color information subcarrier signals is that high frequency, i.e., minute picture details, are monochrome, and that the color information applies only to larger picture details.

To reduce visible dot interference in the television picture, the NTSC color subcarrier frequency of 3.579545 MHz was chosen so that its sidebands are at odd multiples of half of the line scanning frequency, which results in the color side bands being interleaved between high frequency side bands of the luminance signal. Thus, successive dots or picture elements resulting directly from the subcarrier on one scanning line are offset and interleaved with dots on the next scanning line. The interleaved pattern of dots resulting from the subcarrier has heretofore been generally accepted by most viewers of black and white receivers as a noticeable but unobjectionable grid pattern. Some of the reasons why the color subcarrier dot pattern have not been objected to or even seen are that the subcarrier is a high frequency, so that the dots appear very close together and are not therefore too visible at a distance from the picture screen. As already noted, the dots are interleaved from one scanning line to the next, which further reduces their visibility at a distance. Furthermore, most monochrome television receivers of domestic origin are characterized by a relatively low picture bandwidth and therefore will not even reproduce the dot pattern. Finally, since most information in a television picture is generally of low saturation and since it is rare to observe a fully saturated color image outside of a color bar test pattern, for example, the intensity of the dot pattern from the color subcarrier is not much greater than ambient luminance levels upon which the subcarrier dot pattern rides. It has been found that the average color saturation of a television picture is around 20%. Thus, the brightness of a subcarrier dot rarely exceeds 20% of the ambient luminance present on the scanning line.

With pictures displayed on color television receivers, the interleaving of chrominance side bands between luminance side bands at the upper end of the luminance channel spectrum works well for static and low saturation color picture information, where chrominance levels are not exceeding 20%. When high chrominance energy levels are present, the dot pattern levels in the luminance path are excessive and, combined with the high gamma of the picture tube are shifting upwards the average brightness of saturated areas. As a result, for example, a high saturation red will be displayed on the color screen as a pinkish color. It is therefore mandatory, in a color television display, to filter out the subcarrier from the luminance channel prior to application to the display to the display device.

The heretofore commonly employed expedient in color television receivers has been to install a band-reject filter (usually an LC trap) in the luminance path, with a low end 3db attenuation point being between 2.3 and 2.8 MHz. As a result an incoming transition with 150 nanoseconds rise time will be degraded to 250 to 300 nanoseconds. Thus, it is appreciated that heretofore there has been a significant and continual loss of picture resolution in most color television receivers. Also, the band-reject filter introduced ringing on trailing edges of high speed transitions and pulses such as those exemplified by the sine-square test pulse.

Another problem, encountered when imperfect chrominance-luminance separation techniques were used, resulted from the demodulation by the set chroma channels of luminance high frequency components, mistakenly taken as chrominance information by the television set demodulator. As a result, fast luminance transitions were often followed by a rainbow pattern when a simple band-pass filter was used to remove luminance components from the chrominance channel.

Comb filters have been known to separate interleaved components in a complex spectrum with minimum degradations.

As early as 1930, in U.S. Pat. No. 1,769,920, F. Gray described the utilization of a comb filter design to enable interleaving two distinct television picture signals into a single spectrum corresponding to the audio frequency range.

With the advent of the NTSC color television signal format, in which the color subcarrier is interleaved between the high frequency sideband components of the luminance signal, it was proposed to employ the Gray filtering technique to the separation of chrominance and luminance signal information in a color television receiver. Gray's technique was noted in U.S. Pat. No. 3,542,945 to N. W. Parker, issued Nov. 24, 1970. Parker implemented a form of comb filter by combining bandpassed composite video signal (chroma with interspersed luminance components) in an adder with a second input to the adder being bandpassed video first having been passed through a one horizontal scanning line delay line and a phase inverter. Since two successive lines of NTSC chroma subcarrier are 180° out of phase by reference to horizontal synchronization pulses, the two inputs combined as a color subcarrier sum whereas since lines of luminance are originally in phase, the combination of the oppositely phased luminance components inputs to the adder resulted in cancellation therein, thereby providing a comb filtered chrominance output. Parker's circuit then added the separated chrominance without further phase reversal to the composite video input signal (luminance-plus-chrominance) wherein phase cancellation of chrominance occurred resulting in a separated luminance output. In static pictures having low chrominance levels, the Parker comb filter technique worked well. However, for sudden color changes along a vertical axis and other dynamic changes in chrominance signals within the television picture, Parker's comb filter did not eliminate subcarrier dot patterns and other highly visible aberrations and artifacts deviating from the true picture on account of momentary phase shift and consequent loss of interleaving of the color signal within the upper frequency portion of the luminance signal. Another weakness of this approach was the introduction of ringing and echoes in luminance transitions due to the imperfections of 1-line delay lines. These errors were visible even when the comb filter was not required, that is, when the picture color saturation was low.

The usefulness of comb filtering in specialized television applications such as in time base error correction within color video recording and playback systems was disclosed in two of the present applicant's prior U.S. Pat. Nos. 3,674,920 issued July 4, 1972, and 3,764,739 issued Oct. 9, 1973.

In an article entitled "Comb Filter Improvements With Spurious Chroma Deletion," published in *SMPTE Journal* Vol. 86, No. 1, January 1977, pages 1-5, Arthur Kaiser proposed a comb filter color decoder in which the comb filter was replaced during chroma transitions by a conventional low pass filter in the form of a trap. Kaiser's "adaptive" comb filter, while somewhat effective for its intended purpose, was not particularly effective during diagonal chroma transitions; and, implementation of Kaiser's circuitry as blocked out in FIG. 9 of his article, required two full bandwidth delay lines (4.2 MHz bandwidth modules which were then, and still are, very expensive). As a result, Kaiser's circuitry was practically limited to those situations, such as in television studios, where demanding video requirements may have justified the high cost of implementing his chrominance and luminance separation scheme. Another defect, known as "scalloping," was due to the presence of light vertical lines during chroma horizontal or oblical transitions, and was created by the use of two delay lines and perfect vertical alignment of chroma combing residues from line to line.

SOME OBJECTS OF THE INVENTION

A general object of the present invention is comb filter separation of a quadrature modulated subcarrier signal from signal modulating a main carrier in which the subcarrier has been interleaved in a portion of the spectrum thereof, and concomitant removal of subcarrier vestiges from the main carrier signal via adaptive comb filtering.

Another object of the present invention is a more effective elimination of dot patterns and distortion artifacts from a color television picture through comb filtering of chroma and adaptive comb filtering of luminance.

A further object of the present invention is the reduction of subcarrier dot patterns present during changes of color along a vertical axis in a color television picture.

Yet another object of the present invention is to utilize a switching technique which applies a comb filter only when truly needed, that is, when the color saturation is above a predetermined level, in order to allow implementation with low cost 1-line delay lines and therefore to enable widespread adoption of comb filtering techniques at low prime cost.

Another object of the present invention is to provide an adaptive comb filtering system which works equally well in NTSC or PAL color television signal formats.

A further object of the present invention is to provide an adaptive comb filtering system which is equally well suited to implementation with analog or digital circuitry.

SUMMARY OF THE INVENTION

An adaptive comb filter embodying the principles of the present invention for separating, e.g., chrominance and luminance information of a quadrature modulated television signal, includes an input for receiving the quadrature modulated television signal. A chroma separation circuit connected to the input includes a low cost narrow band delay line which provides an output delayed by the period of one horizontal scanning line, and which inherently provides band-pass filtering of the television signal. A high pass filter which is connected to the input passes high frequency components of the signal to a subtractor which also has an input connected from the output of the delay line, the output of the subtractor providing comb filtered chroma. The filter includes an adaptive luminance separation circuit which includes a threshold circuit connected to the output of the chroma separation subtractor circuit so as to receive the separated chroma and put out only those portions of separated chroma which exceed a predetermined threshold level. A limiting amplifier connected to the output of the threshold circuit puts out amplitude limited signals in phase with the portions put out by the threshold circuit output therefrom occurring only when the portions put out by the threshold circuit exceed the predetermined threshold. An adder circuit having inputs connected to combine the outputs of the threshold circuit and the limiting amplifier circuit is also provided in the luminance separation circuit. A delay matching circuit connected to the input provides a fixed delay corresponding to the signal delay occurring between the filter input and the output of the adder circuit. A luminance subtractor circuit connected to the delay matching circuit and the adder circuit subtracts the output of the adder circuit from the output of the delay matching circuit, the difference being adaptively separated and filtered luminance wherein chrominance is removed only when the chrominance level exceeds the predetermined threshold.

Removal of chrominance residues from luminance may optionally be further improved by passing the combed luminance through complementary chroma band-pass and chroma band-reject filters, the band-reject filter being connected to the adder through a switch. An output of the chroma band-pass filter is also passed through a rectifier and the output thereof connected to an input of a two input control logic circuit for the switch. Combed chroma is passed through a rectifier, the output thereof being connected to the other input of the logic circuit. When combed chroma and vestigial chroma in the adaptively combed luminance are present at the same time, the logic circuit opens the switch and removes the band-pass filter connection to the adder, leaving only the band-reject filter connected thereto.

Removal of high frequency luminance components from chroma may optionally be further improved by providing two identical chroma separation circuits connected in series.

The method of the present invention comprises separating, e.g., chrominance from luminance in a quadrature modulated color television signal, by the steps of high pass filtering and simultaneously delaying the television signal by an integral multiple of the period of one horizontal line; high pass filtering the color signal; and, taking the difference of the high pass filtered signal and the high pass filter plus delayed signal to provide a comb filtered chroma output. Then, luminance is adaptively separated and filtered to remove chrominance above a predetermined threshold level by the steps of amplifying those components of comb filtered chroma which exceed a predetermined threshold amplitude; putting out signals having the amplitude thereof limited and their phase and polarity aligned with the amplified chroma components and being present only when those components exceed the threshold; adding the components and the corresponding limited signals to provide a composite waveform existent only when the chroma exceeds the threshold; delay matching the color television signal so that it corresponds to delays in providing the composite waveform; subtracting from the composite waveform said delay matched color television signal to provide an adaptively comb separated and filtered luminance output.

The method of the present invention comprises also the steps of eliminating from the luminance path chroma residues present during chroma horizontal transitions by separating the combed luminance into a band-pass portion and a band-reject portion, these two portions being added after selective switching of the band-pass portion in a switch open during, and only during, chroma horizontal transitions.

These and other objects, advantages, features and characteristics of the present invention will now be discussed in detail in conjunction with the accompanying drawings.

DETAILED DESCRIPTION OF A PREFERRED EMBODIMENT

Figure 1:
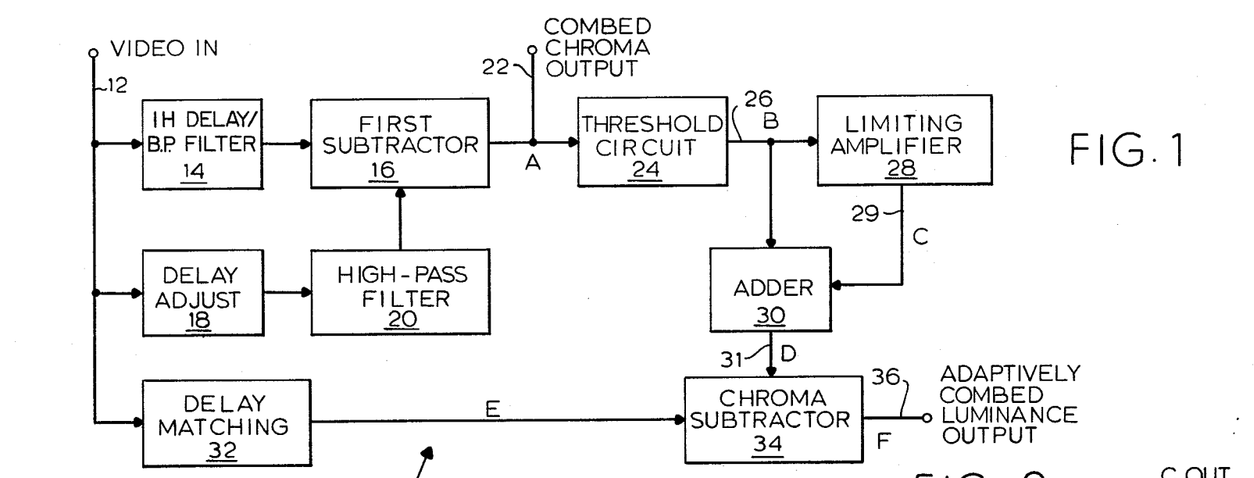
FIG. 1 is a block diagram of a comb filter system for separating chrominance components and for adaptively separating luminance components of a quadrature modulated color television signal, in accordance with the principles of the present invention.

An adaptive comb filter 10 in accordance with the principles of the present invention is shown in FIG. 1. Therein, a video input 12 receives a quadrature modulated color television signal from a source such as a video detector within a color television receiver (not shown). The signal at the input 12 passes through a delay line 14 providing a delay of one horizontal scanning line (63.556 microseconds). The delay line 14 also functions as a band-pass filter having cut-off frequencies of about 2.5 MHz and 4.7 MHz. A low-cost, mass produced, ultrasonic glass delay line, such as those used in PAL or SECAM receivers, is ideally suited for the implementation of the delay line 14.

The one-line-delayed and band-pass filtered output from the delay line 14 is passed to a subtractor circuit 16. At the same time, composite color video is passed from the input 12 through a delay adjustment circuit 18 and a high pass-filter 20 to provide a second input to the subtractor circuit 16 which is not delayed by one scanning line. Thus, the signals provided to the subtractor 16 are timed to be in vertical picture alignment, one scanning line apart.

The delay adjust circuit 18 adjusts the timing of the video passing therethrough so that the signals provided as inputs to the subtractor are exactly one line apart in timing. The high pass filter 20 removes low frequency luminance information.

The subtractor 16 subtracts the signals from the delay line 14 and high pass filter 20 and in so doing combines chroma components together additively in that the chroma components are oppositely phased with respect to one another, whereas the luminance components are cancelled because they are in phase with respect to one another. Thus, an output line 22 from the subtractor 16 provides a combed chroma output in which static luminance components have been cancelled by operation of the subtractor 16 whereas the chrominance components have been summed by the same operation therein.

When low cost, ultrasonic delay lines are used in the chroma path, the luminance cancellation will not be complete, because of imperfections of these lines. As a result, heavy luminance ringing following luminance transitions will be present in the chroma path, and, later on, in the combed luminance path if the chroma (combed) is subtracted from the video without precaution. In the past, this problem was avoided by replacing low cost delay lines with high quality, expensive delay modules. The invention described herein is of a different approach.

Figure 2:
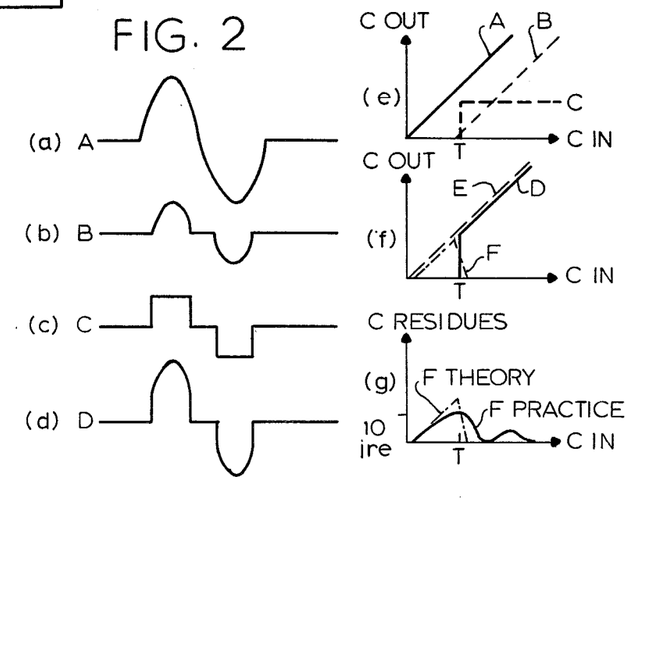
FIG. 2 is a set of waveform diagrams and graphs of various signal points of the system set forth in FIG. 1.

Combed chroma on the output line 22 is applied to the input of a threshold amplifier circuit 24 which functions to amplify portions of the chroma signal which exceed a predetermined threshold amplitude set by the amplifier 24. An output line 26 from the threshold circuit 24 is connected to a limiting amplifier 28 and is also connected as an input to an adder circuit 30. The limiting amplifier 28 puts out amplitude-limited signals and in the same phase and polarity as the portions above the threshold whenever the threshold circuit 24 puts out those portions of the combed chroma. An output line 29 from the limiting amplifier 28 is connected to the adder 30. The adder circuit 30 functions to combine the square wave pulses from the limiting amplifier 28 and the portions of the combed chroma put out by the threshold circuit 24 when the threshold circuit 24 puts out chroma portions which exceed the threshold. Luminance residues which were present in the combed chroma output 22 (waveform A, FIG. 2(a)) are eliminated at the output 31 of the adder 30 (waveform D, FIG. 2(d)), because they do not exceed the threshold level, while chroma above threshold is not effected by the operations performed in the threshold circuit 24, the limiting amplifier 28 and the adder 30.

Composite color video from the input 12 is passed through a delay matching network 32 to a chroma subtractor circuit 34. Output from the adder circuit 30 is also put into the chroma subtractor circuit 34, and it is subtracted from the composite color signal from the delay matching circuit 32. The chroma subtractor 34 functions in such a manner that chrominance components are cancelled from the luminance signal whenever those chrominance components exceed the threshold level as established by the threshold circuit 24. The delay matching circuit 32 delays the composite video signal from the input 12 so that it is combined in the subtractor 34 in the appropriate time relationship with the output from the adder circuit 30. An output 36 of the subtractor circuit 34 provides adaptively combed luminance. The adaptive comb filter circuitry illustrated in FIG. 1 functions to switch on the luminance comb filter only when chroma is above the predetermined threshold level, preferably established at about 10 IRE units, chroma amplitude. The operation of the filter 10 is premised upon the recognition that the eye's perception of the dot pattern resulting from the interleaved chrominance and luminance is perceptible only above a certain threshold level, found to be about 10 IRE units. With the system of FIG. 1, from zero to about 10 IRE units, the threshold circuit 24 does not pass chroma and the eye is perfectly satisfied with the picture as no dots are perceivable below 10 IRE units while luminance residues in the chroma path do not degrade luminance transitions.

The function of the FIG. 1 system is illustrated by the FIG. 2 waveform diagrams. A single cycle of combed chroma information is shown by waveform A. Waveform A is the chroma signal appearing on the combed chroma output line 22. Waveform B appears at the output of the threshold circuit 24. As shown in FIG. 2(b), waveform B models waveform A except that the portion thereof below the predetermined threshold amplitude has been removed so that only the peaks of the sine wave of waveform A remain as waveform B. Phase, however, remains the same. The output of the limiting amplifier 28 is waveform C. Waveform C is seen to be two oppositely extending square waves in phase with and of the same polarity as waveform B. Waveform C steps to the threshold level at the point of limiting to provide the squared waveshape. The output from the adder circuit 30 is waveform D which combines the waveforms B and C as shown in FIG. 2(d).

Further understanding of the operation of the comb filter circuit 10 appears from an analysis of the FIGS. 2(e), (f), and (g) graphs. In FIGS. 2(e) and (f), the abscissa represents the amplitude of the chroma input level, the level appearing at the subtractor output 22; and, the ordinate is the chroma output amplitude. In FIG. 2(e), the solid line diagonal graph is waveform A which shows that the chroma output amplitude is directly proportional to the input. The dashed line labelled B shows that the amplitude of chroma is proportional to input except it is offset by a predetermined threshold amount, labelled T. The output of the limiting amplifier 28, shown as dashed line C, rises immediately at the threshold T and remains at a constant output level for excursions of chroma about the threshold level.

Referring now to FIG. 2(f), the luminance plus chrominance composite signal is labelled E. The output from the adder circuit D is shown to be proportional at input amplitudes in excess of the threshold, but nonexistent below the threshold.

The operation of the chroma subtractor is perhaps best shown by reference to FIG. 2(g) wherein the chroma residues output level in the combed luminance path are represented on the ordinate whereas the chroma input amplitude is represented on the abscissa. Therein, the output of the chroma subtractor 34 is ideally shown in the broken line F, but is shown in practice as the undulating function F which shows a very small amplitude of chroma above the threshold level for chroma excursions thereabove. Luminance ringing introduced by the chroma 1-line delay line deficiencies is not visually perceptible.

While the comb filter system 10 has been described for separation of chrominance and luminance components of an NTSC color signal, it is easily adapted to compatibility in the PAL color system, merely by lengthening the period of the delay line 14 to correspond to two scanning lines. It will also be appreciated by those skilled in the art that the circuitry implementing the comb filter system 10, while described herein as employing analog techniques, may easily be implemented with digital techniques and hardware.

Figure 3:
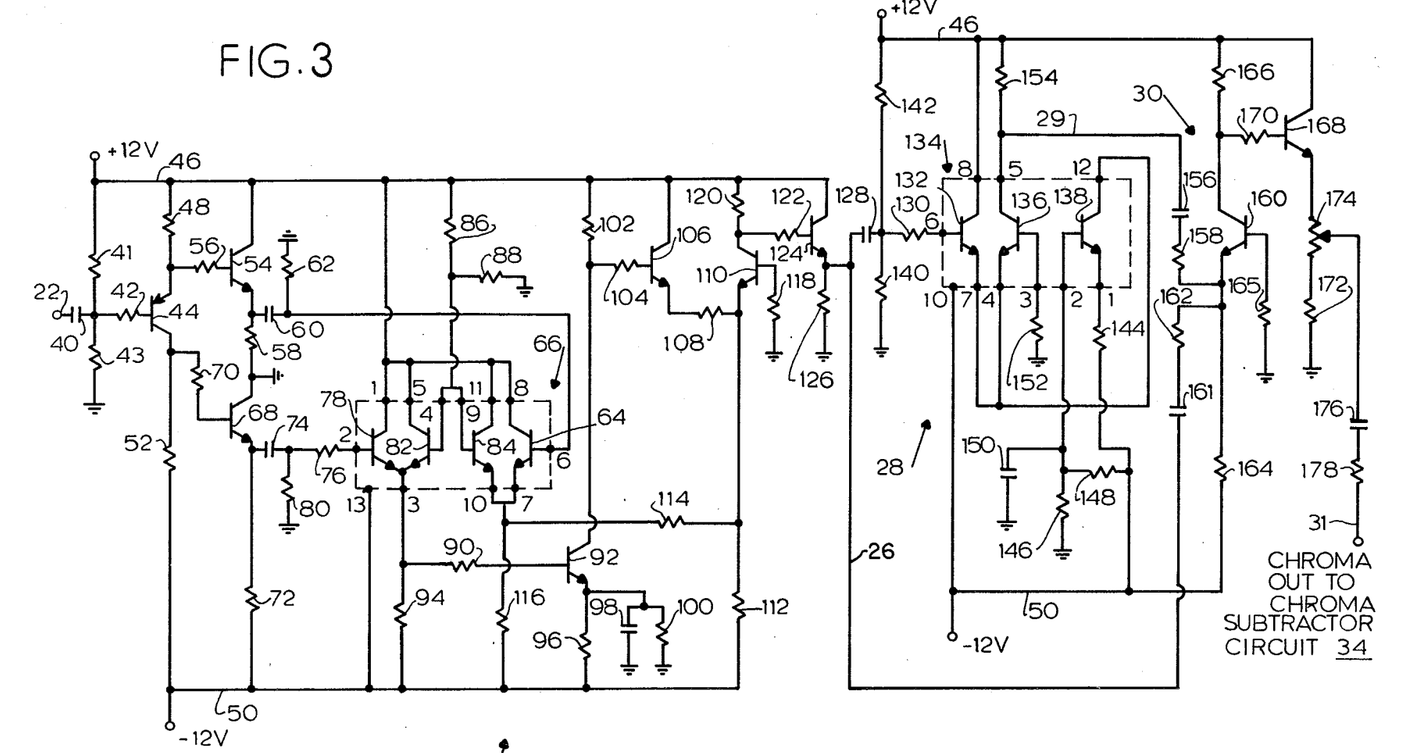
FIG. 3 is a detailed schematic circuit diagram of the threshold circuit, limiting amplifier, and adder of the adaptive luminace separation circuitry of the comb filter system of FIG. 1.

The circuitry of the threshold circuit 24, limiting amplifier 28, and adder circuit 30 is set forth in the FIG. 3 schematic circuit diagram. Therein, the combed chroma output signal is provided via the line 22 as an input to the threshold circuit 24. The input 22 is connected through a blocking capacitor 40 and a timing resistor 42 to the base of the phase inverter transistor 44. A series base bias network of a resistor 41 connected to a plus 12 volt supply bus 46 and a resistor 43 connected to ground has a common node connected to the capacitor 40 and resistor 42. The transistor 44, a PNP transistor, has its emitter tied to the plus 12 volt supply bus 46 through an emitter resistor 48. The collector of the transistor 44 is connected to a minus 12 volt supply bus 50 through a collector resistor 52 which is the same value as the resistor 48, so that the amplitudes of the oppositely phased signals appearing at the collector and emitter of transistor 44 are essentially equivalent. A signal from the emitter of the transistor 44 is connected to the base of an emitter follower transistor 54 through a timing resistor 56. The collector of the NPN transistor 54 is connected directly to the plus 12 volt supply bus 46 and the emitter is connected to ground through a load resistor 58. The output from the emitter follower transistor 54 is connected through a blocking capacitor 60 and a load and bias resistor 62 to ground to a base connection of a transistor 64 within a monolithic integrated circuit transistor array 66 at pin 6 thereof.

The collector of the phase splitter transistor 44 is connected to the base of a second emitter follower transistor 68 through a timing resistor 70. The collector of the transistor 68 is connected directly to ground, and the emitter is connected to the minus 12 volt supply bus 50 through a load resistor 72. The emitter of the transistor 68 is connected through a blocking capacitor 74 and a timing resistor 76 to the base of a second transistor 78 within the transistor array 66. A base bias resistor 80 to ground is connected to the node between the capacitor 74 and the resistor 76.

There are four transistors 64, 78, 82 and 84 within the transistor array 66, which is preferably an RCA type CA3046 integrated circuit. The four transistors 64, 78, 82 and 84 are connected into two differential amplifiers, with the emitters of the transistors 78 and 82 internally tied together and output at pin 3 to form one of the amplifiers and with the emitters of the transistors 64 and 84 tied together at pins 7 and 10 to form the other amplifier. The collectors of the transistor pair 78 and 82 are tied together at pins 1 and 5, and the collectors of the transistor pair 64 and 84 are tied together at pins 11 and 8, and the collectors of all four transistors of the array 66 are connected directly to the plus 12 volt supply bus 46. The bases of the transistors 82 and 84 are connected together at pins 4 and 9 of the array 66 and are connected to the plus 12 volt supply bus 46 through a resistor 86 and to ground through a resistor 88. The ratio of the resistors 86 and 88 establishes a constant voltage at the bases of the transistors 82 and 84 and functions to set the threshold level above which the transistors 64 and 78 will commence linear amplification. The use of the single monolithic integrated circuit 66 provides four transistors of virtually identical forward transfer characteristics.

One output from the differential amplifier comprising the transistors 78 and 82 is taken from the emitter connection at pin 3 through a timing resistor 90 to the base of the transistor 92. A load resistor 94 is connected from pin 3 of the array 66 to the minus 12 volt supply bus 50. The emitter of the transistor 92 is connected to the minus 12 volt bus 50 through a resistor 96, and a frequency compensating network comprising a capacitor 98 and a resistor 100 is also connected from the emitter of the transistor 92 to ground. The collector of the transistor 92 is connected to the plus 12 volt supply bus 46 through a load resistor 102, and through a timing resistor 104 to the base of an emitter follower transistor 106 having its collector tied directly to the plus 12 volt bus 46 and having its emitter connected through a resistor 108 to the emitter of another transistor 110. The transistors 92 and 106 function as phase inverters.

The emitter of the transistor 110 is connected to the minus 12 volt bus 50 through a resistor 112. Also connected to the emitter of the transistor 110 is the output from the second transistor pair of the array 66 comprising transistors 64 and 84 from a common emitter connection thereof at pins 10 and 7. Output is taken through a resistor 114 to the emitter of the transistor 110. The transistor 110 combines the outputs from the two differential amplifiers of the array 66. The emitters of the transistor pair 64 and 84 are also connected to the minus 12 volt supply bus 50 through a resistor 116. The base of the transistor 110 is connected directly to ground through a small value oscillation-suppressing resistor 118. The collector thereof is connected to the plus 12 volt supply bus 46 through a load resistor 120 and is also connected through a delay matching resistor 122 to the base of an emitter follower output transistor 124 having its collector tied directly to the plus 12 volt supply bus 46 and its emitter connected through a load resistor 126 to ground. Output from the threshold-establishing circuit 24 is provided by the output line 26, which is connected directly to the emitter of the output transistor 124.

As shown in FIG. 1, the output line 26 from the threshold circuit 24 is connected to the input of the limiting amplifier 28 and also to the adder circuit 30. With reference to FIG. 3, the line 26 is connected to the limiting amplifier 28 through a blocking capacitor 128 and timing resistor 130 to the base of a transistor 132 within a monolithic integrated circuit array of transistor 134 which includes two other transistors 136 and 138. A base bias network of a resistor 140 to ground and a resistor 142 to the plus 12 volt supply bus 46 is connected to the common node of the capacitor 128 and the resistor 130. The transistor 132 has its collector directly connected to the plus 12 volt supply bus 46 and it has its emitter connected in parallel with the emitter of the transistor 136. The two parallel-connected emitters are connected to the collector of the transistor 138 which functions as a common current source.

The transistor 138 has its emitter connected to the minus 12 volt supply bus 50 through a resistor 144, and the base of the transistor 138 is biased by connection to a resistance network of a resistor 146 to ground and a resistor 148 to the minus 12 volt supply bus 50. The base of the transistor 138 is decoupled by a bypass capacitor 150 to ground. The base of the transistor 136 is connected to ground through a low value resistor 152 which prevents circuit oscillation. The collector of the transistor 136 is connected through a load resistor 154 to the plus 12 volt supply bus 46. The monolithic array 134 is preferably implemented as one of RCA types CA 3018 or CA 3046 integrated circuits.

The output line 29 from the limiting amplifier 28 is connected to the adder circuit 30 via a connection from the collector of the transistor 136 through a blocking capacitor 156 and a balancing resistor 158 to the emitter of a transistor 160. The output line 26 from the threshold circuit 24 is also connected to the emitter of the transistor 160 through a blocking capacitor 161 and a balancing resistor 162 which symmetrically correspond to the capacitor 156 and resistor 158 in series with the output line 29 of the limiting amplifier circuit 28.

The transistor 160 of the adder circuit 30 has its emitter connected to the minus 12 volt bus 50 through a resistor 164 and its base connected to ground through a small value feedback resistor 165. The collector of the transistor 160 is connected to the plus 12 volt supply bus 46 through a load resistor 166 and to the base of an emitter follower output transistor 168 through a small value isolating and delay matching resistor 170. The collector of the transistor 168 is connected directly to the plus 12 volt supply bus 46, and the emitter of the transistor 168 is connected to ground via a fixed resistor 172 in series with a variable resistor 174, the wiper of which provides a variable amplitude output through a blocking capacitor 176 and resistor 178 to the line 31. The output line 31 is connected as the subtrahend input to the chroma subtractor circuit 34 as already described in connection with FIG. 1.

Referring again to FIG. 1, the delay matching circuit 32 is preferably implemented as a passive wide bandwidth lumped constant delay line of approximately 180 nanoseconds in delay length. The 180 nanosecond delay corresponds to the traverse delay of the signal path from the video input 12 through the adder circuit 30.

Figure 4:
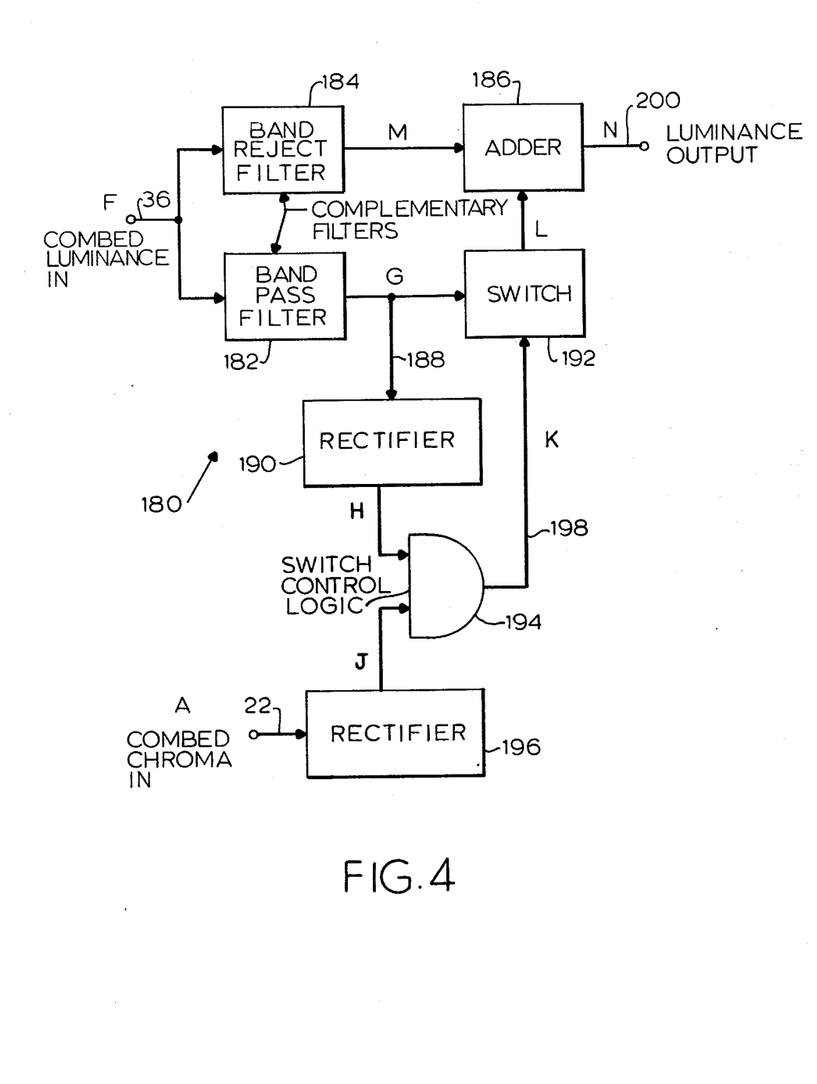
FIG. 4 is a block diagram of additional circuitry which may be added to the comb filter system set forth in FIG. 1 to improve the removal of chroma from luminance.

Turning now to FIG. 4, the additional circuit elements shown therein may be connected to the comb filter system 10 shown in FIG. 1 to provide further suppression of chroma in the luminance path, particularly where the chroma is not perfectly interleaved between high frequency luminance sidebands. This situation usually occurs because of changes in colors in the vertical direction. The subsystem 180 shown in FIG. 4 does not reduce the luminance resolution except when dot pattern is excessive. There are two characteristics of the operation of the subsystem 180 shown in FIG. 4 in conjunction with the system 10 of FIG. 1. First, in the situation where there is no vertical chroma transition, then no dot pattern is visible and a full luminance bandwidth is provided from input to output. Second, during vertical chroma transitions, if the transition signal is present at the same time in the luminance path at around the subcarrier frequency and is also present in the chroma signal path, then the bandwidth of the system is momentarily reduced to block out the chroma from the luminance channel. The second condition is seldom obtained. When it does, the eye does not require resolution because it is distracted by the usually accompanying vertical luminance transition, as well as a change of color, and finally because of the inability of the eye to perceive bandwidth limitations when the border line between adjacent picture zones is essentially horizontal.

Combed luminance input is put into the subsystem 180 of FIG. 4 by connection to the combed luminance output line 36 of the system 10 of FIG. 1. At the same time, combed chroma is put into the subsystem 180 by connection to the combed chroma output line 22 of the system 10 of FIG. 1. The combed luminance input on the line 36 is passed through two complementary filters: a band-pass filter 182 and a band-reject filter 184. The band-pass filter 182 has a band-pass characteristic suitable to pass the chroma subcarrier information and luminance information located around subcarrier frequency, while the band-reject filter 184 rejects the chroma passband but passes the lower frequency luminance components to an adder circuit 186. The band-pass filter 182 has an output line 188 connected to a rectifier 190 and to a switch 192. The rectifier 190 has an output connected to switch control logic 194. The combed chroma from the line 22 is rectified in a rectifier 196 and also connected to the switch control logic circuit 194. An output line 198 from the switch control logic is connected to operate the switch 192.

Figure 5:
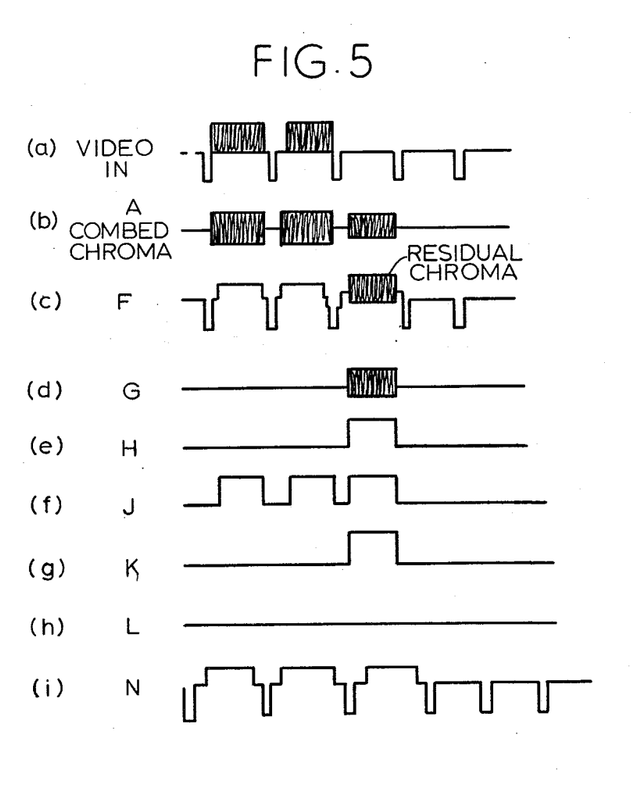
FIG. 5 is a set of waveform diagrams of waveforms of various signal points in the additional circuitry of FIG. 4.

The operation of the FIG. 4 system is perhaps best understood by the FIG. 5 waveform diagrams. The video input signal including the color subcarrier appearing on line 12 of the FIG. 1 system is depicted by a waveform shown in FIG. 5(a). Combed chroma appearing on the combed chroma output line 22 and at the input of the rectifier 196 is depicted as waveform A, FIG. 5(b). The combed luminance appearing on the line 36, which shows elimination of chroma above 10 IRE units, but with residual chroma therebelow, is shown as waveform F, FIG. 2. The output of the band-pass filter 192 is shown as waveform G, FIG. 5(d). The output of the band-pass filter after being rectified by the rectifier 190 appears as a pulse in waveform H, FIG. 5(e). The combed chroma rectified by the rectifier 196 appears as square wave pulses in the waveform diagram J, FIG. 5(f). The logical control signal put out by the switch 192 appears as a pulse in waveform K, FIG. 5(g). The output from the switch 192 which is combined in the adder 186 with the output from the band-reject filter 184 appears at chroma frequencies to be a constant direct current potential in waveform L, FIG. 5(h). The system 180 has a luminance output 200 which appears as composite video in which the chrominance information has been entirely removed in waveform N, FIG. 5(i).

The switch control logic element 194 functions as an AND gate to operate the switch 192 whenever inputs above the switching threshold of the gate 194 are received simultaneously from the rectifiers 190 and 196. Upon operation of the switch 192, the path 188 from the band-pass filter 182 through the switch 192 and ultimately to the adder 186 is opened at the switch 192, so that during vertical color changes, the luminance bandwidth is limited to the bandwidth characteristics of the band-reject filter 184. This is shown illustratively in the waveform diagrams of FIG. 5, particularly waveforms G, H, J, K, L and N.

Figure 6:
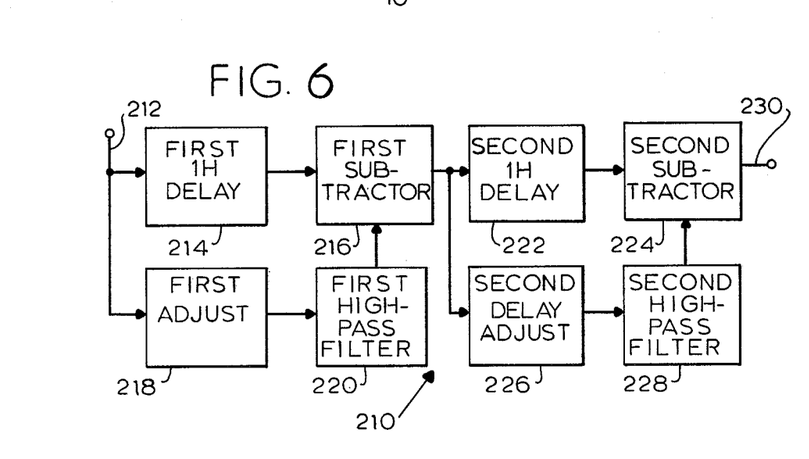
FIG. 6 is a block diagram of alternative circuitry which may be included in the comb filter system set forth in FIG. 1 to improve the removal of luminance from chroma.

Referring now to FIG. 6, the separation of chroma via comb filtering may be improved by duplicating of chroma filter elements set forth in FIG. 1. Thus, in FIG. 6, a video input terminal 212 receives composite video. The input is connected to a first delay element 214 which is of the period of one horizontal line. The output from the delay line 214 is connected to a first subtractor 216. The video signal from the input 212 is also passed through a first delay adjustment circuit 218 and a first high pass filter 220 to the first subtractor 216 where the difference between the high pass filtered video signal and the high pass filtered and delayed signal is obtained and provided as an output to a second section which is identical with the first one. The second section includes a second delay line 222, a second subtractor 224, a second delay adjustment circuit 226 and a second high pass filter 228. Output from the second subtractor which is combed chroma is provided on an output terminal 230. It is to be understood that the operation of the system 210 is similar to the chroma comb filtering circuit described in connection with the system 10 of FIG. 1, except that the comb filtering of chroma is more effective as luminance residues are more effectively eliminated through a double-combing process.

While the apparatus and method of the present invention have been summarized and explicated by illustrative application to processing color television signal components, it will be appreciated by those skilled in the design of telecommunications equipment and systems that the principles of the present invention apply to any system having a quadrature modulated subcarrier interleaved between modulation sidebands of a portion of the bandwidth of a main carrier. Nothing herein should be construed as limiting the scope of the present invention to the processing of only color television signals.

I claim:

1. An adaptive comb filter for separating chrominance and luminance information of a quadrature modulated color television signal and the like having interleaved chroma and luminance sidebands, comprising:
   a filter input receiving said quadrature modulated color television signal,
   chroma separation circuit means including
      delay line and bandpass filter means connected to said filter input for providing bandpass filtering of said signal and for providing an output delayed by the period of one horizontal scan line, high pass filter means connected to said filter input for passing high frequency components of said signal, and first subtractor means connected to said delay line and bandpass filter means and to said high pass filter means for providing as an output the difference thereof, being said separated chroma;

adaptive luminance separation circuit means including threshold circuit means connected to the output of said first subtractor means to receive said separated chroma, for putting out only those portions of said separated chroma which exceed a predetermined threshold, limiting amplifier means connected to said threshold circuit means for putting out squared waves in phase with said portions only when they exceed said predetermined threshold, adder circuit means having inputs connected to combine the outputs of said threshold circuit means and said limiting amplifier means, second subtractor means connected to said filter input and to said adder circuit means for subtracting the output of said adder circuit means from said received color television signal the difference therefrom being said adaptively separated and filtered luminance.

2. The filter set forth in claim 1 further comprising delay matching means connected between said filter input and said second subtractor means, for equalizing the time of arrival of said quadrature modulated color television signal at said second subtractor means and the time of arrival of said output of said adder circuit means thereat.

3. The comb filter set forth in claim 1 further comprisng delay adjusting means connected between said filter input and said high pass filter means for adjusting the time of arrival of said high frequency components of said signal at said first subtractor means to be in proper time relationship with said delayed and filtered output of said delay line means.

4. The filter set forth in claim 1 further comprising a second chroma separation means substantially identical with said chroma separation circuit means and connected in series therewith.

5. The filter set forth in claim 1 further comprising a second adaptive luminance separation circuit means including:

band-reject filter means connected to the output of said second subtractor means for rejecting residual chrominance components in said difference signal therefrom, band-pass filter means, substantially complementary to said band-reject filter means and connected to the output of said second subtractor means, for passing residual chroma components in said different signal therefrom, switch means connected to said band-pass filter means for selectively passing the signal therefrom in response to a control, adder means connected to said band-reject filter means and to said switch means for combining signals received therefrom, a first rectifier connected to the output of said band-pass filter means and having a first rectified output, a second rectifier connected to the output of said first subtractor means and having a second rectified output, a logical gate circuit having inputs connected to said first and second rectifier means, and having an output when said first and second rectified outputs are logically the same, an output from said logical gate circuit being connected to said switch means to provide said control, whereby when said first and second rectified outputs occur at the same time, said switch is then opened and said band-pass filter is disconnected from said adder means thereby providing at the output of said second separation circuit means a signal passing through said band-reject filter means by additional adaptive chroma separation and filtering of said luminance signal output therefrom.

6. The filter set forth in claim 1 wherein said delay line and bandpass filter means is adapted for providing an output delayed by the period of two horizontal scan lines, and wherein said quadrature modulated color television signal is in accordance with PAL color television signal format standards.

7. A method for separating chroma and luminance in a quadrature modulated television signal and the like by the steps of:

bandpass filtering and simultaneously delaying a quadrature modulated color television signal by an integral multiple of the period of one horizontal line, high pass filtering said color television signal, taking the difference of the high pass filtered signal and the bandpass filtered and delayed signal to provide a comb separated chroma output, adaptively separating and filtering luminance from said color television signal by the steps of:

amplifying those components of comb filtered chroma which exceed a predetermined threshold of amplitude, putting out pulses having their amplitude limited to said threshold and their phase and polarity aligned with said components when said components exceed said threshold, adding said components in said corresponding pulses to provide a composite waveform existent only when said chroma exceeds said threshold, delay matching said color television signal to said composite waveform; and subtracting said composite waveform from said delay matched color television signal to provide a comb filter separated luminance output.

8. The method according to claim 7 including repeating steps for separating chroma from luma in a quadrature modulated color television signal to provide additional comb filtering to the comb filtered chroma output.

9. The method set forth in claim 7 further comprising the steps of passing said comb separated filtered luminance output signal through a band reject filter to eliminate vestigial chroma components therein, passing said comb separated and filtered luminance output signal through the band-pass filter and a switch, said band-pass filter for passing said vestigial chroma components, combining said signals output from said band-reject filter and said switch in an adder circuit to provide an output, rectifying the output of said band-pass filter in a first rectifier to provide a first rectified signal, rectifying comb filtered chroma in a second rectifier to provide a second rectified signal, ANDING said first rectified signal and said second rectified signal in a logical gate to provide a control for said switch whereby said switch is opened when said first rectified signal and said second rectified signal occur at the same time.

10. An adaptive comb filter for selectively removing chroma components from a quadrature modulated color television signal passing through said filter and having interleaved chrominance and luminance sidebands, said filter comprising chroma component separation means for separating by comb filtering said chroma components from said signal, chroma component threshold means for passing said separated chroma components whenever they exceed a predetermined combed chroma amplitude threshold, whereby said filter puts out said quadrature modulated color television signal when said chroma components are below said combed chroma amplitude threshold and puts out selectively comb filtered luminance when said chroma components are above said threshold.

* * * * *